Dec. 1, 1925.
Y. M. ATANAY
1,563,314
TORTILLA FORMING MACHINE
Filed June 3, 1925
7 Sheets-Sheet 1
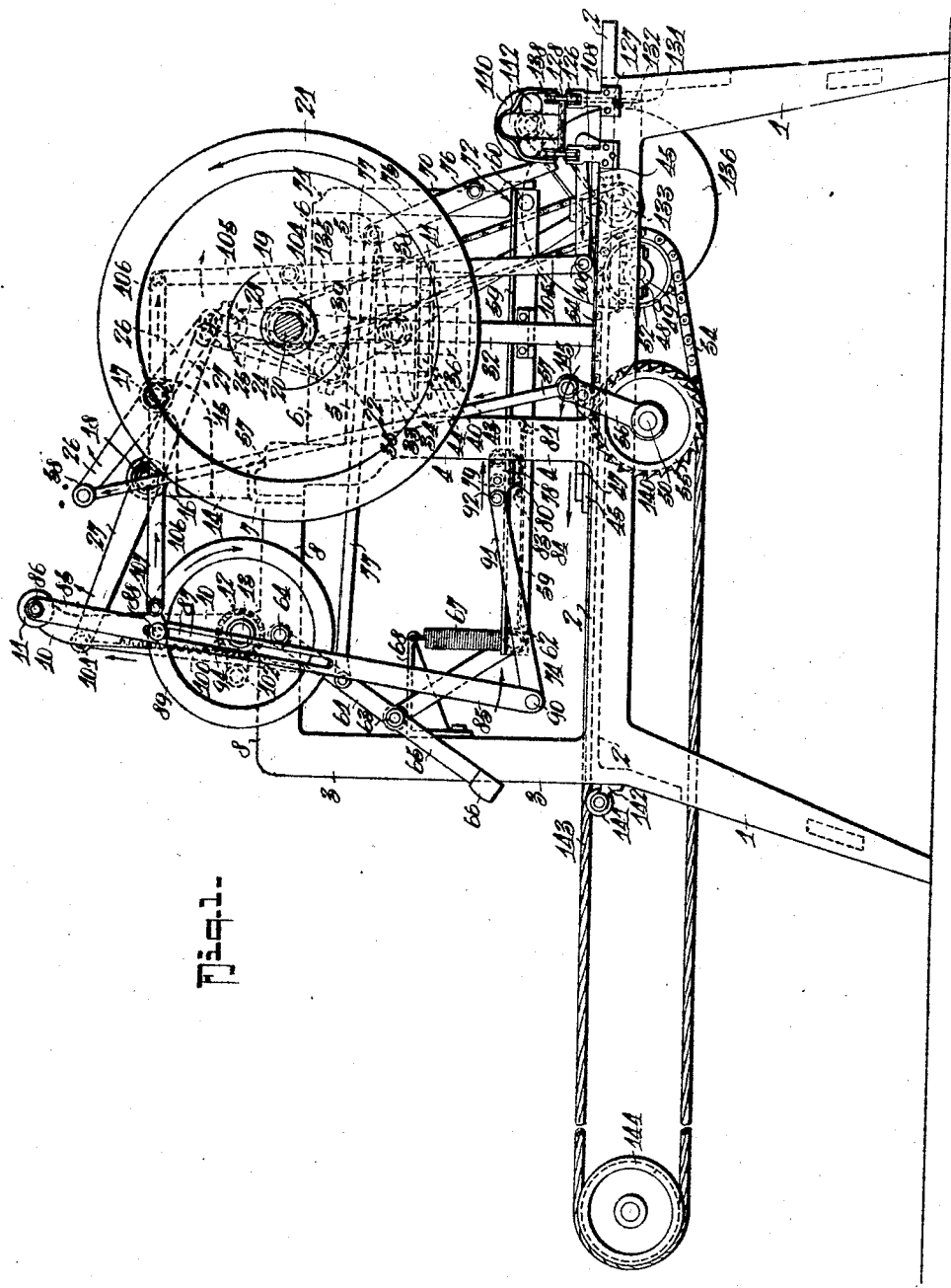
INVENTOR
Ygnacio M. Atanay.
BY
Albert E Dietrich
ATTORNEY

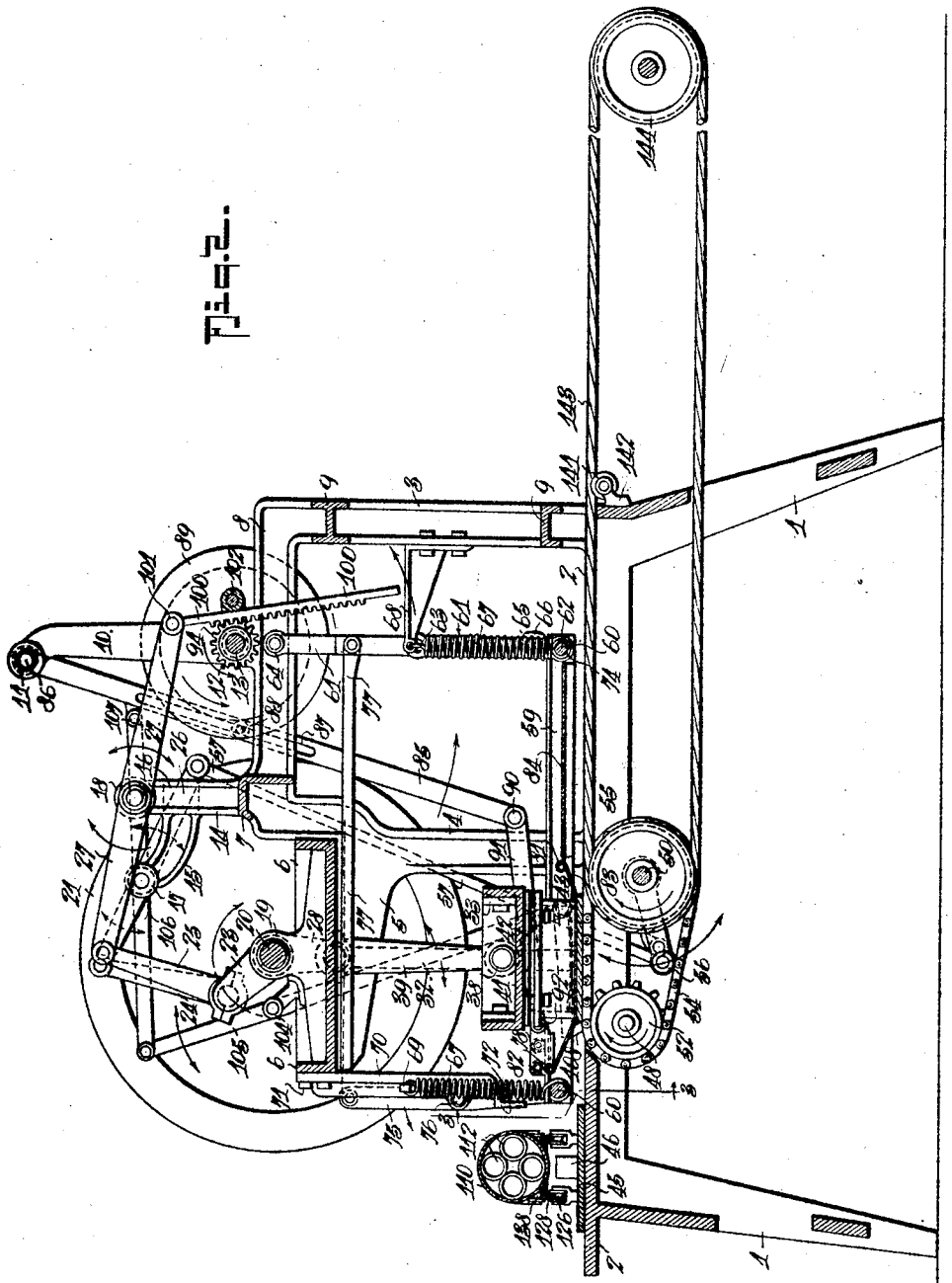

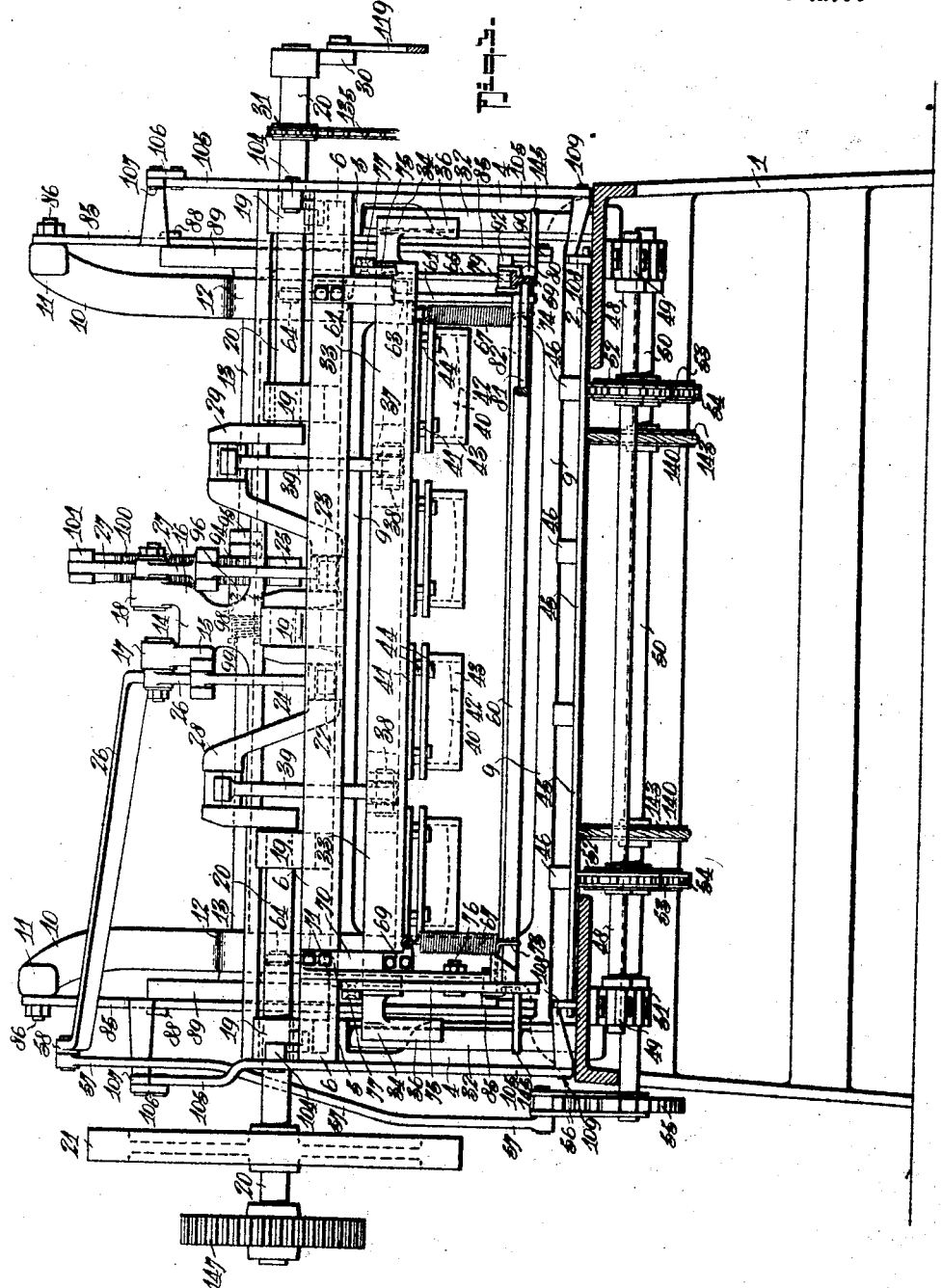

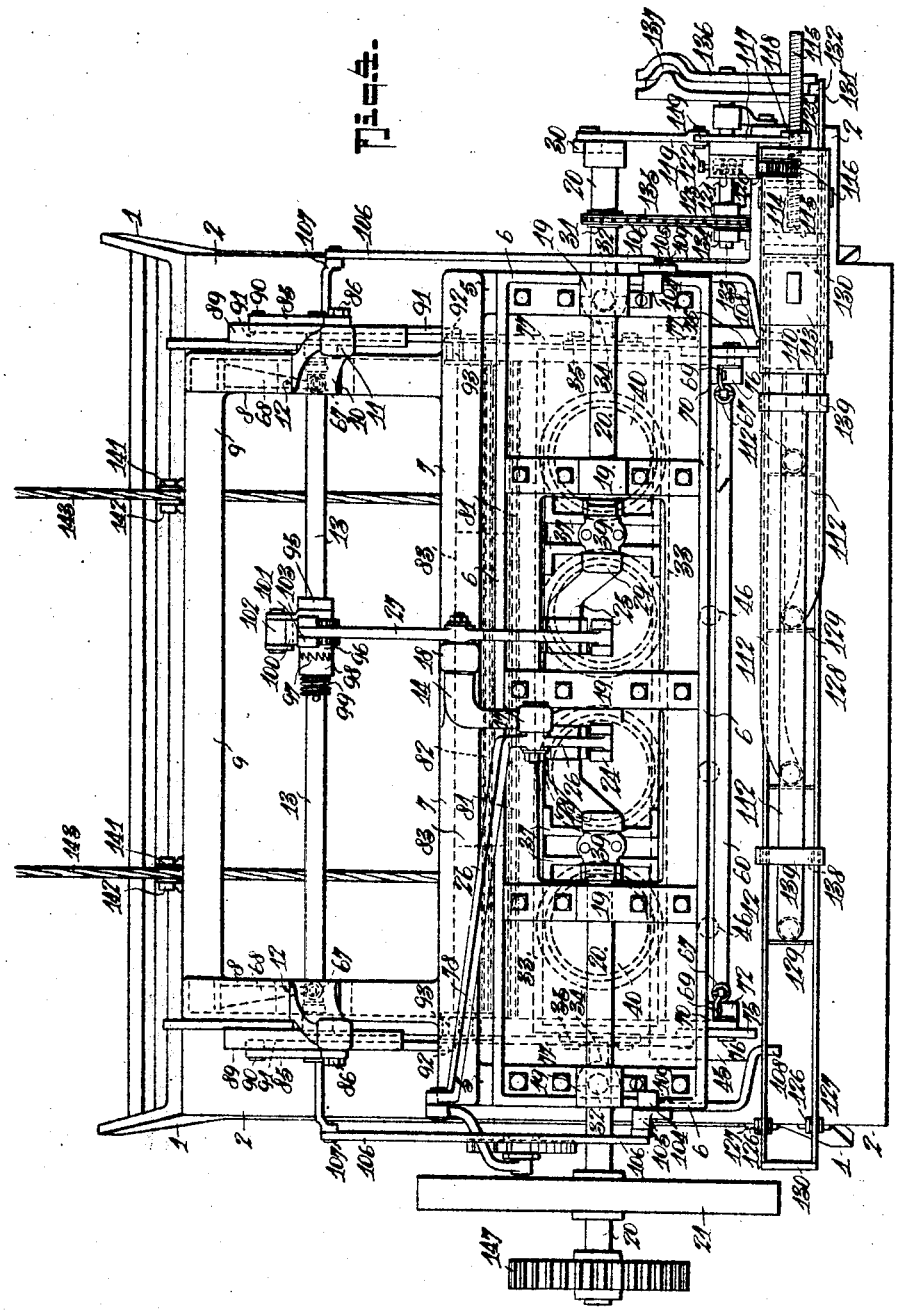

Dec. 1, 1925.
Y. M. ATANAY
TORTILLA FORMING MACHINE
Filed June 3, 1925
1,563,314
7 Sheets-Sheet 5
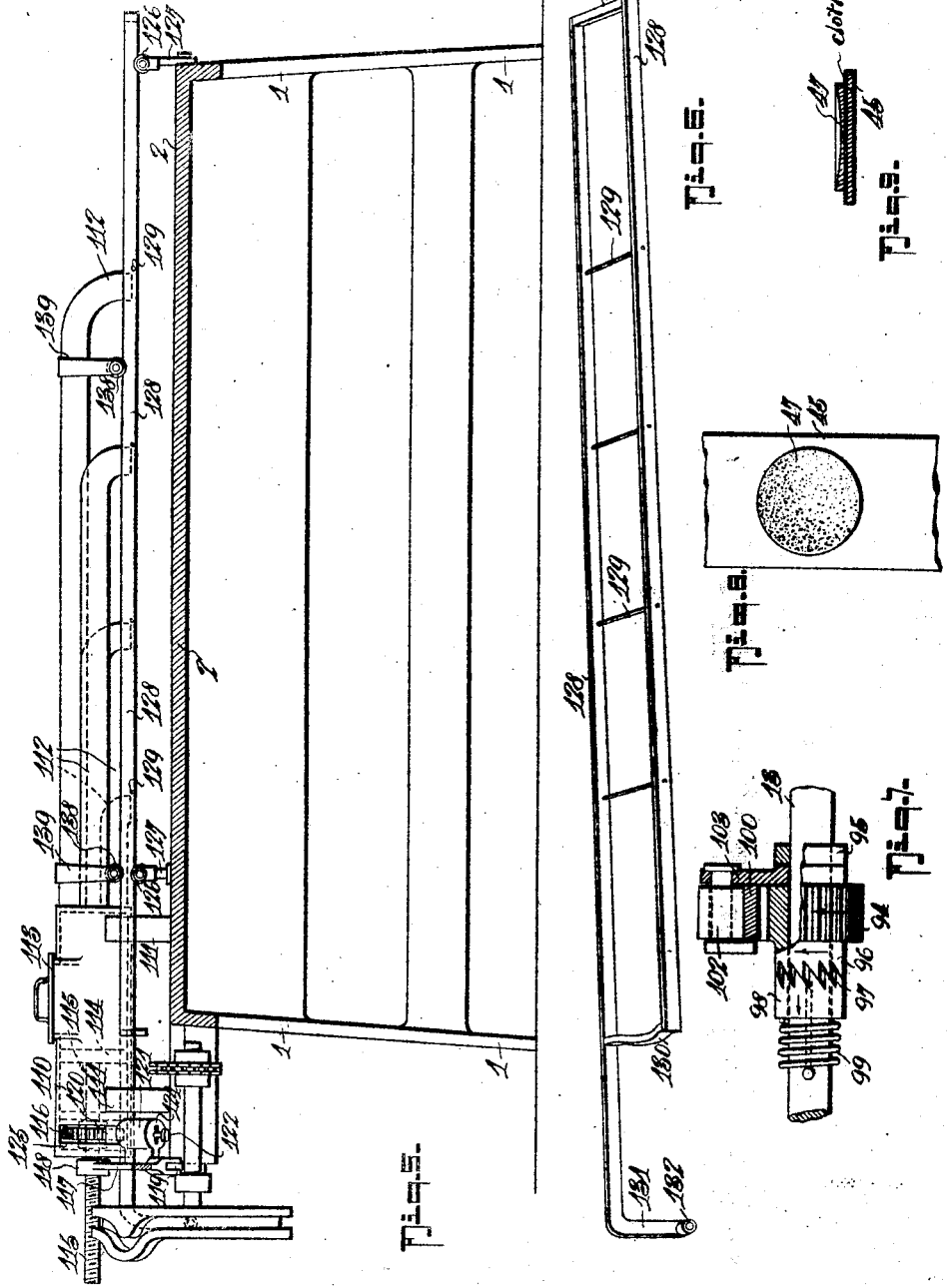
INVENTOR
*Ignacio M. Atanay.*
BY
*Albert E. Dietrich*
ATTORNEY

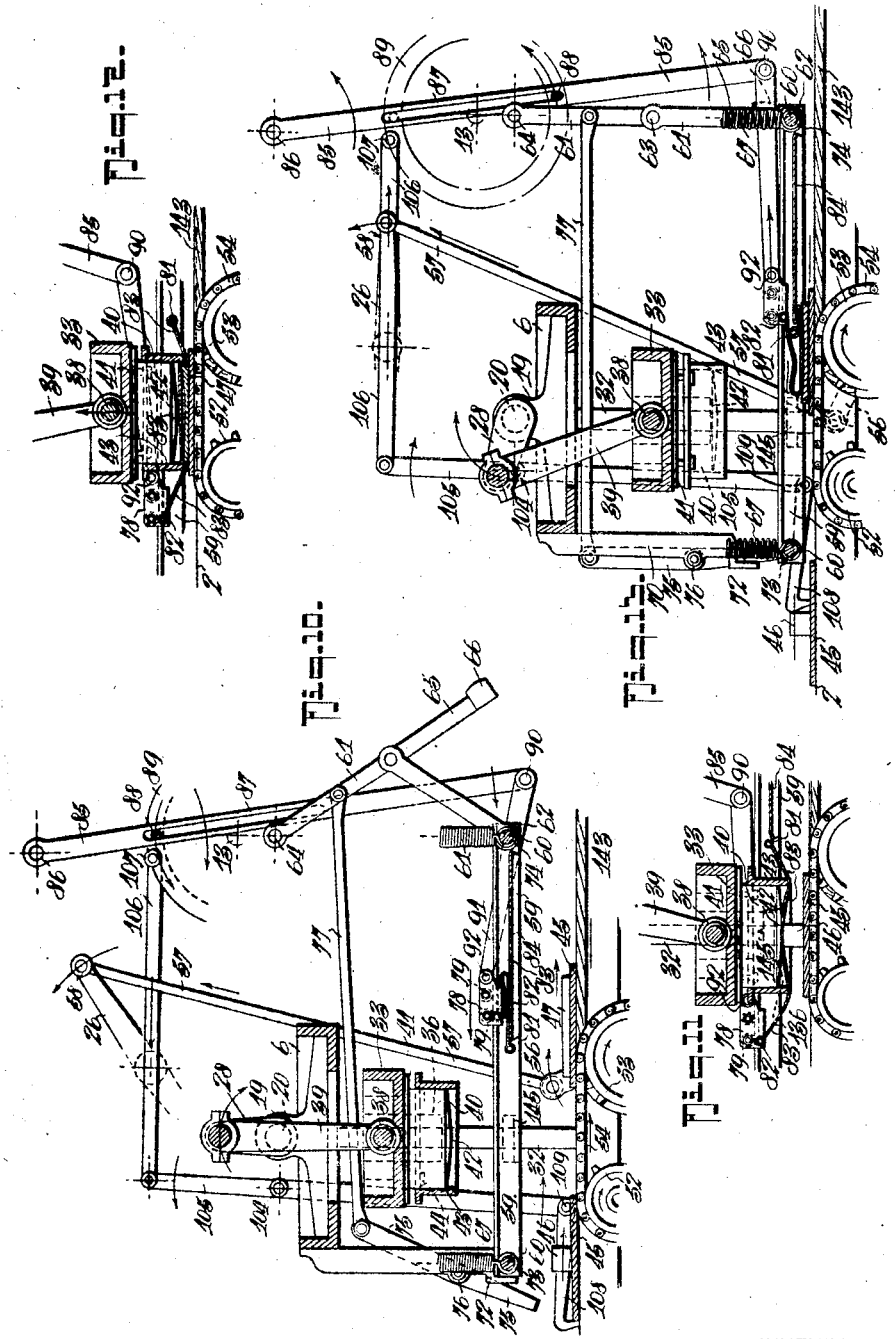

Dec. 1, 1925. 1,563,314
Y. M. ATANAY
TORTILLA FORMING MACHINE
Filed June 3, 1925 7 Sheets-Sheet 7
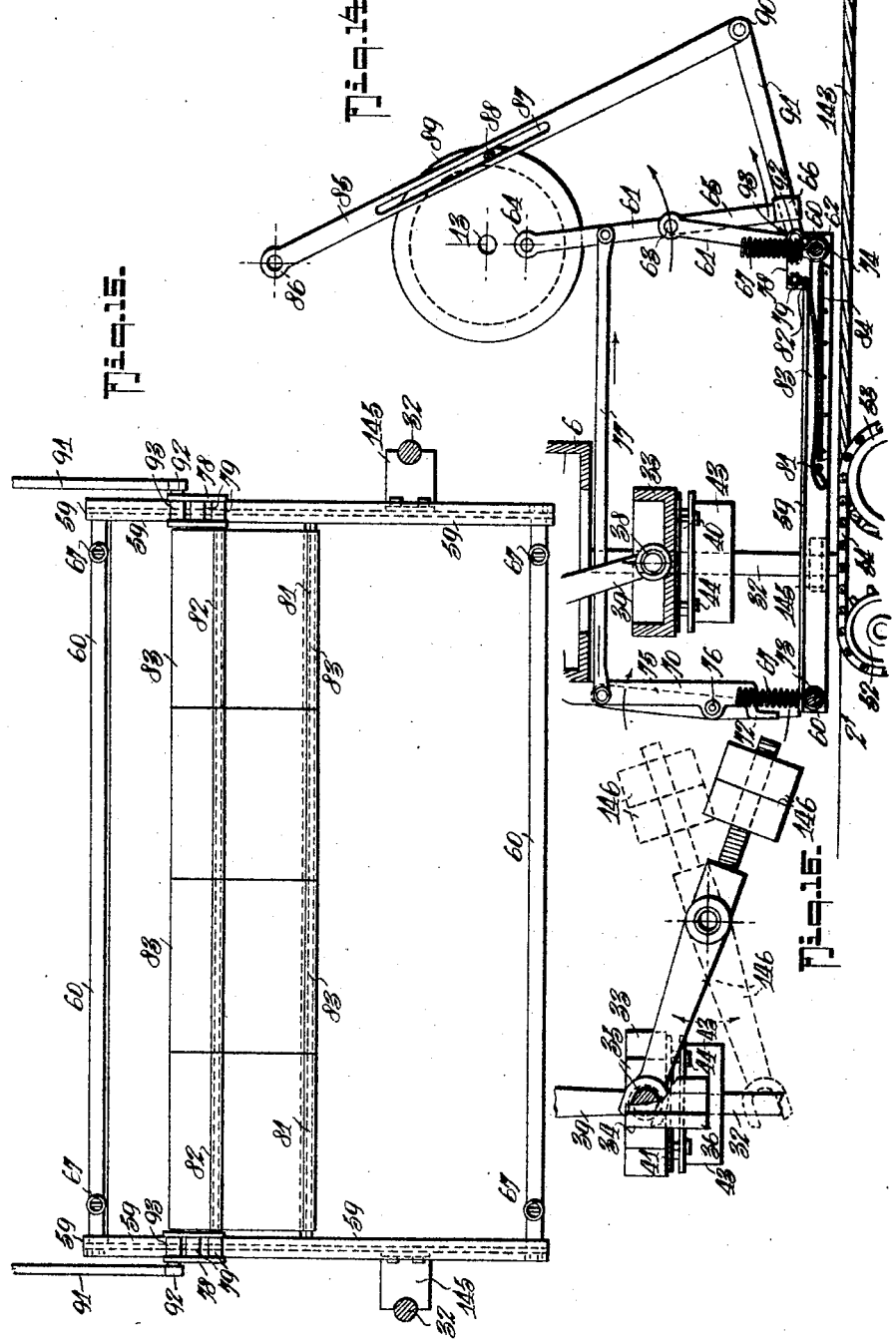
INVENTOR
Ygnacio M. Atanay
BY
Albert E Dietrich
ATTORNEY Patented Dec. 1, 1925.

1,563,314

UNITED STATES PATENT OFFICE.

YGNACIO M. ATANAY, OF LOS ANGELES, CALIFORNIA.

TORTILLA-FORMING MACHINE.

Application filed June 3, 1925. Serial No. 34,695.

*To all whom it may concern:*

Be it known that I, YGNACIO M. ATANAY, a citizen of the United States, residing at Los Angeles, in the county of Los Angeles and State of California, have invented certain new and useful Improvements in Tortilla-Forming Machines, of which the following is a specification.

The invention generally relates to forming machines and has for its primary object the provision of an automatic machine for forming the thin unleavened cakes of maize so popular in Spain and the Latin American countries and which, when completed by baking, are called tortillas.

In its more detailed nature the invention seeks to provide a simple machine structure of the class described which is efficiently operable for expressing and depositing a plurality of dough blanks upon receiving and carrying plates or boards, moving the said plates or boards to the desired position beneath the forming dies, press forming the said blanks to the desired shape, properly extracting or freeing the formed articles from the dies, and transporting the said plates or boards and the formed articles beyond the influence of the forming dies and to a remote position where they may be completed for commercial use by baking.

The invention also seeks to provide a machine of the class described wherein is provided automatic means for expressing and depositing blanks of dough upon carrying boards, means for conveying the boards with the blanks thereon to a point centrally beneath the forming dies, and means for conveying the said boards to a remote position for the baking of the formed articles, the first stated conveying means being timed to complete its function after the function of the last stated conveying means has been completed.

The invention further seeks to provide a machine of the class described wherein is provided means for so interposing a pliable sheeting between the forming dies and the articles being formed that the said sheeting will act as an extracting and freeing medium as the dies are removed from engagement with the formed articles.

The invention further seeks to provide a machine of the class described wherein the said pliable sheeting is mounted upon a frame that is normally held in position removed from that in which said sheeting functions, to thereby prevent interference with the articles upon the carrying boards and which is moved to its cooperative position by movement of the dies.

The invention further seeks to provide a machine of the class described wherein means is provided for holding the frame to its cooperative position and for peeling the sheeting from engagement with the formed articles, the peeling function also serving to release the frame from its held position to permit it to return to its normal position.

With the above and other objects in view the invention still further resides in the novel details of construction, combination and arrangement of parts, all of which will be first fully described, then be particularly pointed out in the appended claims, reference being had to the accompanying drawings in which:—

Figure 1 is a side elevation of the machine, the forming dies being shown at their elevated position about to start on their down stroke.

Figure 2 is a vertical longitudinal section of the machine, the dies being shown at their lowered or tortilla forming position.

Figure 3 is a vertical cross section of the machine taken on the line 3—3 on Figure 2 looking in the direction of the arrows.

Figure 4 is a plan view of the machine as shown in Figure 1.

Figure 5 is a vertical cross section of the machine taken on the line 3—3 on Figure 2 looking in the direction opposite that indicated by the arrows.

Figure 6 is a detail perspective view of the dough blank cutting frame.

Figure 7 is a detail view of the slip-clutch cooperative with the loose pinion.

Figures 8 and 9 are plan and cross sections illustrating the shape of the formed tortillas.

Figures 10–13 are diagrammatic sections illustrating four steps incident to the forming and extraction or freeing of the tortillas.

Figure 14 is a diagrammatic section illustrating how the sheeting stripping means acts to release the guide and carrying frame from its held down position.

Figure 15 is a plan view of the guide and carrying frame.

Figure 16 is a diagrammatic end view illustrating a counterbalance for the dies-carrying head.

In the drawings, in which like numerals of reference indicate like parts in all the figures, 1 indicates the support framing of the machine, 2 the bed or table portion of the framing, 3 a pair of rear vertical side standards, 4 a pair of intermediate side standards from which the supporting arms 5 project forwardly-horizontally.

The arms 5 serve to support the tray-like mounting head 6.

The framing may be constructed to include a cross strengthening beam 7, which extends across and joins the horizontal side beams 8 connected with the rear and intermediate standards 3 and 4, cross strengthening beams 9 being also provided and extending across between the said rear standards 3.

A standard 10 projects vertically from each side beam 8 and serves to provide a pivot bearing head 11 at the uppermost end of each thereof and a bearing 12 adjacent the connection of each thereof with the said beams 8, the said latter bearing serving to facilitate the mounting of the rotatable cross shaft 13, the purpose for which will later appear.

The cross beam 7 is provided with a centrally disposed vertically extending bearing standard 14 from which project bearing arms 15 and 16, each of which includes a pivot bearing head 17 and 18 respectively.

Obviously the framing described above is merely one means of supporting the various mechanisms of the machine and any other type of framing may, of course, be used which might be found particularly adaptable to a particular installation.

The head 6 serves to support a plurality of shaft bearings 19 in which is mounted the crank shaft 20. The said crank shaft is provided at one end with a suitable weighted fly wheel 21, and has a pair of substantially centrally positioned cranks 22 and 23 adapted to be connected by the pitmen 24 and 25 respectively with the rock levers 26 and 27 respectively pivoted, as shown, to the pivot heads 17 and 18 hereinbefore referred to.

The crank shaft 20 is also provided with a pair of presser head moving cranks 28 and 29, one thereof being positioned laterally of each of the centrally positioned cranks just above referred to, and, at the end thereof opposite that upon which the fly wheel is mounted, with a crank shaft 30 and a small sprocket 31, the purpose for both of which will later be explained.

At each side of the machine and suitably anchored in and extending vertically between the arms 5 and the side portions of the table 2 therebeneath, I provide a pair of vertical guide rods 32. It will be observed that the rods 32 are positioned in vertical alignment with the position of the crank shaft 20 and thereby serve as an effective means for guiding the vertical travel of the presser head 33 by reason of contact therewith of the guide bearings 34 secured to the said presser head as at 35, and which are provided with a downwardly extended skirt portion 36, the purpose for which will later be explained.

The presser head 33 is in the nature of a hollow tray and at positions therein beneath the positions of the cranks 28 and 29, cross bars 37 are mounted to provide suitable pivotal connections at 38 for the pitmen 39 that connect the cranks 28 and 29 with the said presser head so that upon rotation of that crank shaft the presser head will be vertically reciprocated, guided by the rods 32 and bearings 34.

A plurality (four being shown) of forming dies 40 are flange secured as at 41 to the presser head 33, and each said die includes the convexly shaped forming surface 42. Each die also includes a surrounding skirt or sleeve 43 which vertically-slidably surrounds the die head proper and which is flange and lug connected, as at 44, to the said presser head in a manner for providing a degree of free movement of the said skirt independently of the movement of the die head proper for a purpose which will later be apparent.

The numeral 45 serves to indicate the boards or plates upon which the blanks of dough 46 are deposited for being acted upon by the forming dies and pressed to the desired completed shape indicated by the numeral 47. The shape of the dough blank is correspondingly indicated in Figures 1 to 3 and 10 and 11 of the drawings, while the completed shape of the tortillas is correspondingly indicated in Figures 8, 9, 12 and 13. The boards 45 may be cloth covered in the manner indicated in Figure 9 of the drawings to facilitate the application of flour and the prevention of all tendency of the tortillas to adhere thereto.

A cross idler shaft 48 is mounted beneath and adjacent the table 2 in suitable bearings 49 secured to that table, and a driven shaft 50 is similarly mounted beneath the table 2 in the bearings 51, see Figures 1 and 3. A pair of small sprockets 52 are secured upon the shaft 48 and a pair of large sprockets 53 are secured on the shaft 50, and a pair of short endless conveyor chains 54 take around the said sprockets 52 and 53 in the manner indicated in the figures referred to. The chains 54 serve to provide a short endless conveyor positioned centrally beneath the functioning path of the forming dies.

One end of the shaft 50 is extended and has secured thereupon a ratchet wheel 55 which is adapted to be acted upon by the spring pawl equipped arms 56 through the medium of the pitman 57 connected to the end 58 of the rocker arm 26 for the purpose of imparting step-by-step movement to the said conveyer chain 54 to remove the formed tortilla and the board upon which they are mounted from beneath the path of travel of the forming dies at the proper interval.

A pair of T-rails 59 are provided and are secured together by the cross shafts 60 secured to the ends thereof so as to provide a rigid open rectangular frame. A pair of toggle levers 61 are connected, as at 62, to the rear cross rods 60, and pivoted together as at 63, and as at 64 to the side beams 8, the upper ones thereof being extended beyond the connection 63 as at 65 and provided with an abutment heel 66, the purpose for which will later appear.

The frame 59—60 is normally held in an elevated position, see Figures 1, 3 and 10, by the springs 67, a pair of which are provided at the rear end of the frame and secured to the bracket 68, which are in turn secured to the standards 3, and a similar pair of which are provided at the front end of that frame and mounted upon the brackets 69 secured to the arms 70 which are in turn dependently secured to the head 6 as at 71.

The arms 70 are each provided at their lower ends with an abutment foot 72 adapted to engage the ends of the rails 59 when the frame is in the elevated position.

The front pair of springs may be connected, as at 73, to the front cross rods 60 of the frame and those at the rear similarly connected as at 74.

As above stated the springs 67 serve to hold the frame to the noraml elevated position, and at the rear end, the toggle links 61, when in the position illustrated in Figures 2 and 13, serve to hold the frame to its lowered position after it has been forced down to that position by an agency that will later be explained. To provide for the proper holding down of the front end of the frame a pair of levers 75 are pivoted at 76 to the arms 70 and are link connected as at 77 with the uppermost ones of the toggle links 61 so that when the toggles are in the position just above referred to the levers 75 will be held to the vertical position indicated in that figure referred to with their lower ends engaging the rails 59 for the purposes specified. When the toggle links 61 are broken, in a manner that will later be explained, the levers 75 will be moved to the position indicated in Figures 1 and 10 of the drawings and will permit elevation of the frame to the normal position under spring action.

A stripper carriage 78, provided with anti-friction rollers 79, is adapted to ride upon the head of each T-rail 59, and each said carriage is provided with inturned fingers 80 for engaging the said rail head to prevent displacement of the said carriage therefrom during its travel, see Figures 3, 10 and 13.

A cross rod 81 is secured across between the rails 59 and a similar cross rod 82 is secured across between the carriages 78, the said latter cross rod being mounted on a plane above that on which the first named rod is mounted so that when the carriages are reciprocated upon the rails 59, the rod 82 may freely pass over the rod 81. A strip of rubber sheeting 83 is provided and adapted to extend across beneath all of the plurality of forming dies with the fore and rear edges thereof secured to the cross rods 81 and 82, the first mentioned rod 81 providing a fixed connection, of course, while that provided by the rod 82 provides a movable connection movable with the carriage 78. Obviously the sheeting 83 may be in one piece or it may be found desirable to form the same in individual strips corresponding to each forming die so that individual ones thereof may be replaced as needed. Such an arrangement is indicated in Figures 3 and 4 of the drawings. It will also be understood that while I find it particularly desirable to use thin rubber sheeting because of its ready susceptibility of flexing and stretching and the attendant great efficiency in effecting the tortilla extraction, other pliable sheeting may be used.

While the use thereof is not essential, as the medium of the rubber sheeting and the functioning of the frame 59—60 will prevent interference with the tortilla, a supporting tray 84 may be secured to the rails 59 to extend across the same beyond the rod 81 so as to support the said sheeting when in the position indicated in Figures 1 and 10 of the drawings to thereby absolutely ensure against the hanging down of the sheeting into interfering contact with the formed tortillas.

An actuator arm 85 is pivoted at 86 to each pivot head 11, the said arms each including a longitudinal slot 87 through which pass the actuating pins 88 which project from the cam wheels 89, one of which is secured upon each end of the cross shaft 13, so that when the said wheels are rotated, in a manner later to be described, the arms 85 will be moved to oscillate on the pivots 86.

Each arm 85 is connected at its lower end, as at 90, with a pitman 91 connected, as at 92, with the respective carriage 78 to cause the said carriage to reciprocate upon the rails 59 as the arms 85 are oscillated in the manner just described.

The connections 92 of the pitmen 91 with the carriages 78 include a cross abutment head portion 93 which, when the carriage is moved to its rearmost position, see Figure 14, engages the abutment heel 66 of the extended portion 65 of the upper toggle link 61 and breaks the toggle, effecting a forward releasing action of the levers 75 and permitting the frame 59—60 to be returned to its elevated position by action of the springs 67.

For suitably rotating the cam wheels 89 at the proper interval the cross shaft 13 is provided with a loosely mounted pinion 94. A suitable abutment collar 95 is secured upon the shaft 13 at one side of the pinion 94, and the opposite face of that pinion is provided with a clutch face 96 adapted to cooperate with a similar clutch face 97 formed on the clutch head 98, spline connected to the said shaft 13, and spring held to engagement with the said clutch face 96 as at 99.

A rack bar 100 is pivotally connected at 101 to the rear end of the rock lever 27, and an idler roller 102, connected to suitable cooperative relation with that rack bar and upon the shaft 13 by the arm connection 103, serves to always hold the said bar with the teeth thereof in meshing contact with those of the pinion 94.

By reason of the particular clutch arrangement, as the rocker lever 27 is rocked and the rack bar 100 moved vertically therewith, rotation will be imparted to the shaft 13 and cam wheels 89 in one direction only, the clutch connections 96 and 97 acting as a ratchet on the down stroke in the manner indicated in Figure 7 of the drawings, thus permitting pinion 94 to rotate freely during the down stroke of that bar without imparting rotation to the said shaft 13.

A pivot bearing 104 is secured adjacent each end of the head 6 and serves as a pivotal connection for the positioning lever 105 link connected as at 106 with the connection 107 extending laterally from each arm 85. Each lever 105 is provided at its lower end with a hook dog 108 pivotally connected to the lower end of that lever, as at 109, and serving, when the lever 105 is rocked through the connections 106—107, to reach forwardly, hook over the board carrying the dough blanks and to move the same to a position centered beneath the forming dies in the manner indicated in Figures 1, 2, 3 and 10.

For suitably expressing and depositing the dough blanks upon the boards 45 to be conveyed into proper position below the forming dies, I provide a dough receiving hopper 110 positioned as at 111 above the table and which has projecting therefrom a plurality of tubes 112 (equal in number and extending to positions in alinement with the forming dies) and an opening or door 113 through which the dough may be supplied to the said hopper.

A forcing plunger 114 is slidable within the hopper and has secured thereto a feeding screw 115 having a quick pitch thread. A ratchet wheel 116 is mounted within one end of the hopper, is restrained against longitudinal movement, and has a central threaded bore through which the screw 115 passes so that when the wheel is rotated the screw and plunger carried thereby will be caused to move instantly to retract the said plunger, or to force it against the dough in the hopper for the purpose of forcing dough out through the discharge ends of the tubes 112.

An arm 117 may be pivotally mounted upon the screw 115, as at 118, and is link connected, as at 119, to the crank 30 mounted on the end of the crank shaft 20. The arm 117 carries a spring pawl 120 slidably mounted in the casing body 121 carried by that arm. The said spring pawl is normally forced into engagement with the ratchet wheel 116 and is provided with an extending pin having a retractable head and a cross pin 123 which may, if desired, be retracted through the cross slot 124 provided in the end of the casing 121 and turned an amount sufficient to hold the pawl out of engagement with the ratchet wheel. In this manner the dough feeding mechanism may be thrown out of operation whenever desired. The hopper may be provided with a suitable cutout 125 to permit the necessary movement of the spring pawl.

Suitable rollers 126, bracket secured as at 127 to the table 2, serve as anti-friction supporting means for the rails 128, across which, at suitable intervals, are secured cutter wires 129, see Figures 5 and 6. The rails are joined at and adjacent their ends by cross bars 130, and one end of one of the rails, extended and down-turned as at 131, is provided with a cam engaging roller 132. It will be understood by reference to the said Figure 5 that when the plunger 114 has been actuated to force cylindrical columns of dough out of the discharge ends of the tubes 112 of sufficient length and the rails 128 then longitudinally moved, the wires 129 carried thereby will be caused to traverse the discharge ends of the tubes and cut off the columns to provide the substantially lozenge-shaped dough blanks indicated by the numeral 46. A countershaft 133 is suitably bracket supported by the table 2 in parallel relation to the dough hopper, and the said shaft is provided with a small sprocket 134 over which takes the power transmission chain 135 for imparting rotation to that shaft from the sprocket 31 on the crank shaft 20, and a groove cam 136 having a quick-acting groove 137. The roller 132 on the end of the dough cutter frame is projected into the cam groove 136—137 and the cam is so positioned that the quick-acting groove will act to instantly move the cutter frame at the proper interval to provide the desired size of dough blanks.

Suitable rollers 138, supported as at 139 by the tubes 112, may be provided to engage the upper edges of the rails 128 to prevent vertical displacement thereof.

Suitable pulleys 140 are secured upon to rotate with the shaft 50, and idler supporting pulleys 141 may be bracket secured to the rear end of the table 2 to support the conveyor cables 143 which take over the said pulleys 140 and which are adapted to convey the formed tortillas to a remote point where they may be completed for commercial use by baking. Such additional pulleys 144 may be provided as may be found necessary or desirable.

It will be observed by reference to Figures 1, 3, 10 and 11 that each T-rail 59 has secured thereto, to project laterally therefrom, a guide and abutment member 145 which are adapted to partially straddle the guide posts 32 and to be engaged by the downwardly extending skirt portion 36 of the guide bearing 34 with which the presser head 33 is provided when that presser head is lowered to force the forming dies into engagement with the dough blanks. The engagement of the skirt 36 and the members 145 will cause the frame to be forced downwardly with the forming dies in the manner indicated in Figure 11 of the drawings, and, of course, when that frame has been forced to its lowermost position the toggle links 61 and the levers 75 will have been brought into position for holding the same to that lowered position after the dies start to again rise and will be released by abutment of the carriages 78.

If desired the presser head 33 may be provided at each end with a suitable pivoted counterweight lever 146 to relieve some of the strain on the crank shaft 20.

Power may be applied to the crank shaft 20 in any suitable manner and for this purpose I have indicated a pinion 147 mounted upon one end of that shaft.

Operation.

Assuming the parts to be in the position indicated in Figure 1 of the drawings, that is with the crank shaft 20 positioned for raising the presser head 33 and the forming dies carried thereby to the uppermost limit of their stroke. In this position the frame 59—60 will be elevated, the board and dough blank positioning connections 105, 106, and 109 will be functioning to bring the board and dough blanks thereon into centered position beneath the forming dies, the carriages 78 having completed their function of stripping the rubber sheeting from the tops of the tortillas, and the breaking of the toggle links 61, will be returning to their forward normal position and the connections 22, 24, 26, 55, 56 and 57 will be functioning to impart a step movement to the conveyers 54 and 143 to move the board and the formed tortillas thereon beyond influence of the said forming dies soon to descend.

By the time the forming dies have completed a small portion of their downward movement the carriages 78 will have been returned to their forward normal position for stretching the rubber sheeting 83 beneath the down-coming dies, the connections just referred to have moved the conveyers and have come to rest, and the board 45 and dough blanks deposited thereon have been moved to the proper position centrally beneath the forming dies. The parts are so timed that the movement of the conveyers 54 and 143 will have been completed just prior to the completion of the movement of the devices which transfer the board and dough blanks from beneath the depositing mechanism to the central position beneath the forming dies.

As the dies descend, guided by the posts 32, the skirts 36 will engage the members 145 and carry the frame down with the dies in the manner indicated in Figure 11 of the drawings. As the dies continue to their lowermost limit they will press the dough blank to its intended complete shape and will carry the frame 59—60 down to its lowermost limit, the toggle links 61, the connections 77 and 75 then serving to hold that frame down as the dies again recede upwardly. It will be observed by reference to Figures 11 and 12 that as the tortilla is formed the rubber sheeting will be between the die body 40 and the tortilla and as the said dies move to their finally lowered position the surrounding skirts 43 will move slightly vertical because of the free movement permitted by reason of the connection thereof. The dough blank will be pressed to the shape indicated in Figure 2 of the drawings, the depending edges of the skirts 43 serving to confine the edges thereof.

By reference to Figure 12 of the drawings it will be observed that as the dies recede the frame 59—60 will be held to its lowered position against the action of its supporting springs 67, and as the skirts 43, by reason of their weight, fall back down to the lowermost limit of their connection, they will coact with the stretched rubber sheeting in extracting or discharging the formed tortillas from engagement with the forming dies, thereby overcoming any possibility of sticking.

As the dies continue to rise, the connections 22, 24, 26, 55, 56 and 57 will be brought into function for moving the conveyers 54 and 143 to remove the board 45 and the formed tortillas from beneath the forming dies. The connections 25, 27, 100, 94, 89, 88, 85, 91 and 78 will also be brought into action to function in the manner illustrated in Figure 13 of the drawings to peel the rubber sheeting from contact with the tortillas, thus overcoming any tendency to adhere, should any exist, and peeling the said sheeting in a manner which will in no wise interfere with the formed tortillas. It will be observed that the complete rotation of the wheels 89, or in other words, a complete oscillation of the arm 85 is effected during each upward half stroke of the crank 23.

Obviously, therefore, the movement of the carriages 78 effective in peeling the rubber sheeting from the tops of the tortillas will be much more rapid than the movement of the formed tortillas upon the conveyers 54 and 143.

As the carriages approach the rearmost limit of their stroke, effected by the oscillation of the arms 85, the cross abutment portion 93 of those carriages will engage the heels 66 with which the toggle links are equipped and effect a movement thereof, in combination with the springs 67, from the position illustrated in Figure 13 to that illustrated in Figure 10 and such as will permit elevation of the frame to the position illustrated in the said Figure 10, substantially above the tortillas and ensuring against any possibility of interference therewith. During the complete functioning of the arms 85 the board positioning dogs 108 will have been extended forwardly to grasp another dough blank equipped board for projecting the same into the proper centered position beneath the dies.

It will be observed, by reference to the foregoing disclosure, that all of the functioning of the machine, with the exception of the primary feeding of the boards 45 beneath the dough hopper and tubes 110 and 112, is automatic.

From the foregoing description, taken in connection with the accompanying drawings, it is thought that the novel details of construction, manner of operation, and the advantages of my invention will be readily apparent to those skilled in the art to which it relates.

What I claim is:—

1. A machine of the character described comprising a framing including a bed onto which tortilla boards are placed, a dough blank depositing means, means for pressing the dough blanks into tortilla shape, devices for feeding the board along the bed from a position beneath the depositing means to position beneath the forming means and a conveyor associated with said forming means to remove the boards and their contents from the forming means after the pressing action has been completed, an elastic apron, an elastic apron carrier and means to operate said carrier to project and retract said apron to and from position beneath said pressing means for the purposes described.

2. A machine of the class described comprising a framing including a bed, means for depositing dough blanks upon a carrying board, means for press-forming the dough blanks into the desired tortilla shape, means for conveying the carrying board from beneath the press-forming means after it has completed its function, and means for conveying the carrying board from beneath the dough blank depositing means to suitable position beneath the press-forming means.

3. A machine of the class described comprising a framing including a bed, means for depositing dough blanks upon a carrying board, means for press-forming the dough blanks into the desired tortilla shape, means for conveying the carrying board from beneath the press-forming means after it has completed its function, means for conveying the carrying board from beneath the dough blank depositing means to suitable position beneath the press-forming means, and means for operating the first stated conveying means to cause the same to complete its conveying function just prior to the completion of function of the second stated conveying means for conveying a succeeding carrying board of dough blanks to position beneath the press-forming means.

4. A machine of the class described comprising a framing including a bed, means for depositing dough blanks upon a carrying board, means for press-forming the dough blanks into the desired tortilla shape, endless conveyors and means for moving them step-by-step for conveying the carrying board from beneath the press-forming means after it has completed its function, and oscillatable arms having pivoted hook dogs and means for operating them to convey the carrying board from beneath the blank depositing means to suitable position beneath the press-forming means, the devices for operating the endless conveyors and the oscillatable arms being timed so that the step-by-step movement of the former will be completed just prior to the completion of movement of the latter.

5. A machine of the class described comprising a framing including a bed, conveying devices for conveying dough blanks and tortilla carrying boards along the bed, means for depositing dough blanks upon a carrying board, means for forming the dough blanks to the desired tortilla shape, and means for projecting a thin sheet of pliable material between the forming means and the dough blanks during the forming action and thereafter removing again the sheet of pliable material from between the forming means and dough blanks.

6. A machine of the class described comprising a framing including a bed, conveying devices for conveying dough blank and tortilla carrying boards along the bed, means for depositing dough blanks upon a carrying board, means for forming the dough blanks to the desired tortilla shape, and means for placing a thin sheet of pliable material between the forming means and the dough blanks during the forming action and thereafter removing the same.

7. A machine of the class described comprising a framing including a bed, conveying devices for conveying dough blank and tortilla carrying boards along the bed, means for depositing dough blanks upon a carrying board, means for forming the dough blanks to the desired tortilla shape, means for stretching a thin sheet of pliable material between the forming means and the dough blanks during the forming action, and means for peeling the pliable sheet off the tops of the formed tortillas after the forming action.

8. A machine of the class described comprising a framing including a bed, conveying devices for conveying dough blank and tortilla carrying boards along the bed, means for depositing dough blanks upon a carrying board, means for forming the dough blanks to the desired tortilla shape, means for stretching a thin sheet of pliable material between the forming means and the dough blanks during the forming action, means for peeling the pliable sheet off the tops of the formed tortillas after the forming action, and a supporting pan for receiving the pliable sheet as peeled to prevent flap hanging.

9. A machine of the class described comprising a framing including a bed, conveying devices for conveying dough blank and tortilla carrying boards along the bed, means for depositing dough blanks upon a carrying board, means for forming the dough blanks to the desired tortilla shape, means for stretching a thin sheet of pliable material between the forming means and the dough blanks during the forming action, means for normally supporting the pliable sheet elevated above the dough blanks, means for forcing the supporting means down to close relation above the dough blanks during the forming action, and means for releasing the supporting means to permit it to move to its normal position after the forming action.

10. A machine of the class described comprising a framing including a bed, conveying devices for conveying dough blank and tortilla carrying boards along the bed, means for depositing dough blanks upon a carrying board, means for forming the dough blanks to the desired tortilla shape, means for stretching a thin sheet of pliable material between the forming means and the dough blanks during the forming action, means for normally supporting the pliable sheet elevated above the dough blanks, means for forcing the supporting means down to close relation above the dough blanks during the forming action, and means for peeling the pliable sheet off the tops of the formed tortillas after the forming action and for releasing the supporting means to permit it to move to its normal position.

11. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, and means for moving the plunger.

12. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, said moving means including a screw attached to the plunger, a wheel through which the screw threads, means for confining the wheel against longitudinal movement, and means for rotating the wheel to cause the screw and plunger to move longitudinally.

13. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, and means movable across the ends of the tubes for severing the dough forced from the tube ends into lozenge-like blanks.

14. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, means movable across the ends of the tubes for severing the dough forced from the tube ends into lozenge-like blanks, said severing means comprising a frame having a fine wire cutting strand adjacent each tube end for traversing the ends as the frame is moved longitudinally and means for moving the frame.

15. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, means movable across the ends of the tubes for severing the dough forced from the tube ends into lozenge-like blanks, said severing means comprising a frame having a fine wire cutting strand adjacent each tube end for traversing the ends as the frame is moved longitudinally and means for moving the frame, said frame moving means and said plunger moving means being associated in timed relation whereby the lozenge shaped blanks are severed to desired and uniform sizes.

16. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, said moving means including a screw attached to the plunger, a ratchet wheel through which the screw threads, means for confining the ratchet wheel against longitudinal movement, and a spring pawl equipped arm and means for oscillating the same to cause rotation of said ratchet wheel and longitudinal movement of the plunger.

17. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, said moving means including a screw attached to the plunger, a ratchet wheel through which the screw threads, means for confining the ratchet wheel against longitudinal movement, a spring pawl equipped arm, means for oscillating the same to cause rotation of said ratchet wheel and longitudinal movement of the plunger, and for effecting movement of the dough blank forming means, said spring pawl being retractible out of engagement with the ratchet wheel to provide for cutting out the dough blank depositing means.

18. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, means movable across the ends of the tubes for severing the dough forced from the tube ends into lozenge-like blanks, said severing means comprising a frame having a fine wire cutting strand adjacent each tube end for traversing the ends as the frame is moved longitudinally, means for moving the frame, said frame moving means and said plunger moving means being associated in timed relation whereby the lozenge-shaped blanks are severed to desired and uniform sizes, means for effecting movement of the dough blank forming means and associated with the frame moving and plunger moving means to cause the latter two to move in proper timed relation with the former.

19. A machine of the class described comprising a framing including a bed, conveying devices for conveying dough blank and tortilla carrying boards along the bed, means for depositing dough blanks upon a carrying board, means for individually and simultaneously forming the dough blanks to the desired tortilla shape, said dough blank depositing means comprising a dough receiving hopper, a number of tubes extending therefrom and having tubular discharge ends, a plunger in the hopper for forcing dough from said hopper into and through said tubes, means for moving the plunger, means movable across the ends of the tubes for severing the dough forced from the tube ends into lozenge-like blanks, said severing means comprising a frame having a fine wire cutting strand adjacent each tube end for traversing the ends as the frame is moved longitudinally, means for moving the frame, and roller bearings above and below the frame for facilitating movement and preventing displacement thereof.

20. In a forming machine, forming dies, means for supporting blanks to be formed, means for moving the dies to and from engaging relation with the blanks, said dies each having a forming head portion and a depending surrounding skirt, an elastic apron and means for stretching said apron between the dies and the blanks during the engaging action of the dies with the blanks, substantially as shown and described.

21. In a forming machine, forming dies, means for supporting blanks to be formed, means for moving the dies to and from engaging relation with the blanks, means for stretching a rubber sheet between the dies and the blanks and holding the same there during the engaging action of the dies with the blanks, the said dies each having a forming head portion and a depending surrounding skirt.

22. In a forming machine, forming dies, means for supporting blanks to be formed, means for moving the dies to and from engaging relation with the blanks, means for holding taut a sheet of elastic material between the dies and the blanks during the engaging action of the dies with the blanks, the said dies each having a forming head portion and a depending surrounding skirt loosely slidable on and carried by the forming head portion, and means for mounting the surrounding skirt on the forming head portion in a manner for permitting a limited degree of independent vertical movement.

23. In a forming machine, forming dies, means for supporting blanks to be formed, means for moving the dies to and from engaging relation with the blanks, means for stretching a thin sheet of pliable material between the dies and the blanks during the engaging action of the dies with the blanks, the said dies each having a forming head portion and a depending surrounding skirt whereby to confine the edges of the blank being formed and to stretch the engaged portion of the pliable sheet during the forming action.

24. In a forming machine, forming dies, means for supporting blanks to be formed, means for moving the dies to and from engaging relation with the blanks, means for stretching a thin sheet of pliable material between the dies and the blanks during the engaging action of the dies with the blanks, the said dies each having a forming head portion and a depending surrounding skirt whereby to confine the edges of the blank being formed and to stretch the engaged portion of the pliable sheet during the forming action, and means for loosely slidably mounting the surrounding sheet on the forming head in a manner permitting a degree of free vertical movement whereby, when the dies recede from the formed blanks, the stretch of the pliable sheet will be aided by free movement of the surrounding skirt in effecting extraction of the formed blanks from influence of the dies.

25. In a forming machine, forming dies, means for supporting blanks to be formed, means for moving the dies to and from engaging relation with the blanks, said dies each having a forming head portion and a depending surrounding skirt, means for positioning a thin sheet of pliable material between the dies and the blanks during the engaging action of the dies with the blanks, and means for peeling the pliable sheet from the tops of the formed blanks after the forming action.

26. In a forming machine, forming dies, means for supporting blanks to be formed, means for moving the dies to and from engaging relation with the blanks, means for stretching a thin sheet of pliable material between the dies and the blanks during the engaging action of the dies with the blanks, the said dies each having a forming head portion and a depending surrounding skirt whereby to confine the edges of the blank being formed and to stretch the engaged portion of the pliable sheet during the forming action, means for loosely slidably mounting the surrounding skirt on the forming head in a manner permitting a degree of free vertical movement whereby, when the dies recede from the formed blanks, the stretch of the pliable sheet will be aided by free movement of the surrounding skirt in effecting extracting of the formed blanks from influence of the dies, and means for peeling the pliable sheet from the tops of the formed blanks after the forming action.

27. In a forming machine, forming dies, means for supporting blanks to be formed, a common head for carrying the forming dies, power operated devices for moving the common head to cause the dies to move to and recede from engaging relation with the blanks, means for positioning a thin sheet of pliable material between the dies and the blanks during the engaging action, and devices for moving the sheet positioning means to adjacent relation with the blanks during the engaging action and for returning the same to its normal position after such engaging action.

28. In a forming machine, forming dies, means for supporting blanks to be formed, a common head for carrying the forming dies, power operated devices for moving the common head to cause the dies to move and recede from engaging relation with the blanks, means for positioning a thin sheet of pliable material between the dies and the blanks during the engaging action, devices operated by movement of the dies toward engaging relation with the blanks for moving the sheet positioning means to adjacent relation with the blanks during the engaging action, and means for effecting a return of the positioning means to its normal position after the blank engaging action.

29. In a forming machine, forming dies, means for supporting blanks to be formed, a common head for carrying the forming dies, power operated devices for moving the common head to cause the dies to move to and recede from engaging relation with the blanks, means for positioning a thin sheet of pliable material between the dies and the blanks during the engaging action, devices operated by movement of the dies toward engaging relation with the blanks for moving the sheet positioning means to adjacent relation with the blanks during the engaging action, means for temporarily locking the devices to the adjacent position, and means for releasing the temporary locking means after the engaging action is completed to permit the positioning means to return to normal position.

30. In a forming machine, forming dies, means for supporting blanks to be formed, a common head for carrying the forming dies, power operated devices for moving the common head to cause the dies to move to and recede from engaging relation with the blanks, means for positioning a thin sheet of pliable material between the dies and the blanks during the engaging action, devices operated by movement of the dies toward engaging relation with the blanks for moving the sheet positioning means to adjacent relation with the blanks during the engaging action, means for temporarily locking the devices to the adjacent position, and means for peeling the pliable sheet from the tops of the formed blanks after the engaging action and for releasing the temporary locking means after the engaging action is completed to permit the positioning means to return to normal position.

31. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, and a thin sheet of pliable material supported by the rectangular frame across the path of travel of the dies for the purposes specified.

32. In a forming machine, forming dies, means for supporting blanks to be formed, a common head for carrying the forming dies, power operated devices for moving the common head to cause the dies to move and recede from engaging relation with the blanks, an open rectangular frame through which the dies move to engage the blanks, a thin sheet of pliable material supported by the rectangular frame across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, and means for releasing the locking means to permit the frame to return to its normal position.

33. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, and means for moving the carriages to effect a release of the temporary locking means to permit the frame to return to its normal position.

34. In a forming machine, forming dies, means for supporting blanks to be formed, a common head for carrying the forming dies, power operated devices for moving the common head to cause the dies to move and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, means for moving the carriages to cause the rod carried thereby to effect a stripping of the sheet from the tops of the formed blanks and for causing them to abut the temporary locking means to release it and permit return to normal of the said frame.

35. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, means for moving the carriages to effect a release of the temporary locking means to permit the frame to return to its normal position, the said carriage moving means being associated with to be operated by the power operated devices for moving the common head.

36. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, means for moving the carriages to effect a release of the temporary locking means to permit the frame to return to its normal position, the said carriage moving means being associated with to be operated by the power operated devices for moving the common head, and means for effecting such association with said power devices whereby said carriage moving means is rendered active only after the dies have started to recede from their engaging relation.

37. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the same to the forced position against the spring action, means for moving the carriages to effect a release of the temporary locking means to permit the frame to return to its normal position, the said carriage moving means being associated with to be operated by the power operated devices for moving the common head, means for effecting such association with said power devices whereby said carriage moving means is rendered active only after the dies have started to recede from their engaging relation, said last named means including a slip clutch operable in one direction only.

38. In a forming machine, forming dies, means for supporting blanks to be formed, a common head for carrying the forming dies, power operated devices for moving the common head to cause the dies to move to and recede from engaging relation with the blanks, means for positioning a thin sheet of pliable material between the dies and the blanks during the engaging action, devices for moving the sheet positioning means to adjacent relation with the blanks during the engaging action and for returning the same to its normal position after such engaging action, take off conveyor devices for conveying the blank supporting means and the formed blanks thereon from beneath the dies after the engaging action, and means for moving a blank supporting means with blanks thereon to position beneath the forming dies.

39. In a forming machine, forming dies, means for supporting blanks to be formed, a common head for carrying the forming dies, power operated devices for moving the common head to cause the dies to move to and recede from engaging relation with the blanks, means for positioning a thin sheet of pliable material between the dies and the blanks during the engaging action, devices for moving the sheet positioning means to adjacent relation with the blanks during the engaging action and for returning the same to its normal position after such engaging action, take off conveyor devices for conveying the blank supporting means and the formed blanks thereon from beneath the dies after the engaging action. means for moving a blank supporting means with blanks thereon to position beneath the forming dies, and means for effecting timed operation of said supporting means conveying action and said moving action whereby the conveying action will be completed prior to the completion of the moving action.

40. In a forming machine, forming dies, means for supporting blanks to be formed, a common head for carrying the forming dies, power operated devices for moving the common head to cause the dies to move and recede from engaging relation with the blanks, means for positioning a thin sheet of pliable material between the dies and the blanks during the engaging action, devices for moving the sheet positioning means to adjacent relation with the blanks during the engaging action and for returning the same to its normal position after such engaging action, take off conveyor devices for conveying the blank supporting means and the formed blanks thereon from beneath the dies after the engaging action, means for moving a blank supporting means with blanks thereon to position beneath the forming dies, said conveying and said moving means being associated with the power operated devices for moving the common head whereby to be moved in proper timed relation to act during receding movement of the forming dies.

41. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, means for moving the carriages to effect a release of the temporary locking means to permit the frame to return to its normal position, and means operable by connection with the carriage moving means, for advancing a blank supporting means to suitable position beneath the forming dies.

42. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, means for moving the carriages to effect a release of the temporary locking means to permit the frame to return to its normal position, means operable by connection with the carriage moving means for advancing a blank supporting means to suitable position beneath the forming dies, and other means for conveying the blank supporting means from beneath the dies after completion of the forming action.

43. In a forming machine, forming dies, means for supporting blanks to be formed, a common head for carrying the forming dies, power operated devices for moving the common head to cause the dies to move to and recede from engaging relation with the blanks, an open rectangular frame through which the dies move to engage the blanks, a thin sheet of pliable material, a rod secured to the frame and a rod secured to carriages movably mounted on the frame to which the respective ends of the sheet are secured to normally mount the sheet across the path of travel of the dies, springs for holding the frame to an elevated position, lateral projections carried by the frame, skirt projections carried by the common head for engaging the projections of the frame when the said head moves to the engaging position to force the same to position the sheet close to the blanks, means for temporarily locking the frame to the forced position against the spring action, means for moving the carriages to effect a release of the temporary locking means to permit the frame to return to its normal position, means operable by connection with the carriage moving means for advancing a blank supporting means to suitable position beneath the forming dies, other means for conveying the blank supporting means from beneath the dies after completion of the forming action, said carriage moving means and said conveying means being operatively connected with the power operated devices for moving the common head whereby said carriage moving means, said conveying means and said advancing means are caused to act during the receding movement of the forming dies and whereby said conveying means will complete its movement prior to completion of the movement of the advancing means.

44. In a tortilla machine, a vertically reciprocable presser die having a recess, blank supporting plates, means for depositing charges of dough upon said plates, means to move said plate into position beneath said die and remove same at intervals, means to reciprocate the die, an elastic sheet, and means to hold said sheet between the die and dough charges on the plates during the pressing action.

45. In a tortilla machine, a vertically reciprocable presser die having a recess, blank supporting plates, means for depositing charges of dough upon said plates, means to move said plates into position beneath said die and remove same at intervals, means to reciprocate the die, an elastic sheet, means to hold said sheet between the die and dough charges on the plate during the pressing action and means to strip the sheet from the pressed article.

46. In a tortilla machine, a vertically reciprocable presser die having a recess, blank supporting plates, means for depositing charges of dough upon said plates, means to move said plates into position beneath said die and remove same at intervals, means to reciprocate the die, an elastic sheet and means to project said sheet between the die and the dough charges on the plate prior to the pressing operation and to remove the same after the pressing operation.

47. In a tortilla machine a vertically reciprocable presser die, blank supporting plates, means for depositing charges of dough upon said plates, means to move said plates into position beneath said die and remove same at intervals, means to reciprocate the die, a flexible sheet and means to project said sheet between the die and the dough charges on the plate prior to the pressing operation and to remove the same after the pressing operation, said projecting means comprising a suspended frame, a carriage, and mechanism for moving said frame and carriage to perform their respective functions.

48. In a tortilla machine the combination with pressing dies and a dough receiving plate; a thin rubber sheet located between the die and the dough blanks on the plate whereby the sheet will be stretched into the die in pressing and will shrink or retract when pressure is released to eject the formed blank from the die and tend to free itself from the blank.

49. In a tortilla making machine, the combination with the pressing die and dough blank receiving board, of a rubber sheet adapted to be located beneath the die and over the dough blank on the board, means to hold said sheet taut as the die performs its pressing function whereby the dough will, as it is pressed into the die, stretch the sheet into the die, said sheet, as the die is raised, shrinking or retracting to free the blank from the die.

50. In a tortilla making machine the combination with the pressing die and dough blank receiving board, of a rubber sheet adapted to be located beneath the die and over the dough blank on the board, means to hold said sheet taut as the die performs its pressing function, whereby the dough will, as it is pressed into the die, stretch the sheet into the die, said sheet, as the die is raised, shrinking or retracting to free the blank from the die, and means to peel the sheet from the blank after completion of the pressing operation.

51. In a tortilla machine, a vertically reciprocable presser die having a recess or chamber, blank supporting plates, means for depositing charges of dough upon said plates, means to move said plates into position beneath said die and remove same at intervals, means to reciprocate said die to effect the pressing operation, an elastic sheet, means to stretch said sheet over the blank supporting plates beneath the die prior to the pressing operation and to remove the same after the pressing operation.

52. In a tortilla machine, a vertically reciprocable presser die having a recess or chamber, blank supporting plates, means for depositing charges of dough upon said plates, means to move said plates into position beneath said die and remove same at intervals, means to reciprocate said die to effect the pressing operation, an elastic sheet, means to stretch said sheet over the blank supporting plates beneath the die prior to the pressing operation and to remove the same after the pressing operation, said means comprising a support to which one end of said sheet is secured and a reciprocating carriage to which the other end of said sheet is secured.

YGNACIO M. ATANAY.